J. D. MARVIL.
WHEEL TIRE.
APPLICATION FILED SEPT. 11, 1908.
925,930.
Patented June 22, 1909.
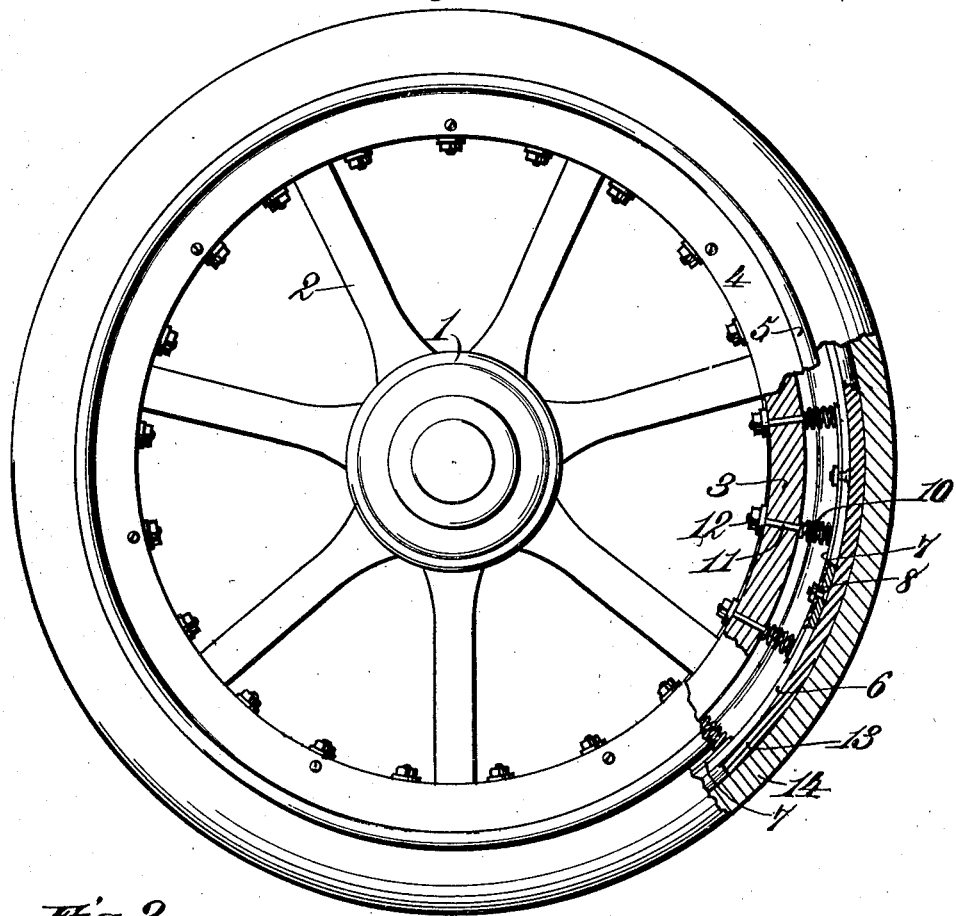
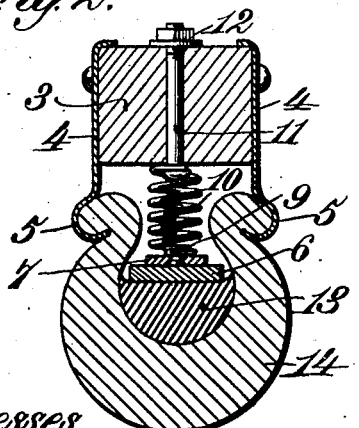
Witnesses.
Inventor:
Joshua D. Marvil.
By James L. Norris
Atty.

UNITED STATES PATENT OFFICE.

JOSHUA D. MARVIL, OF LAUREL, DELAWARE.

WHEEL-TIRE.

No. 925,930.

Specification of Letters Patent.

Patented June 22, 1909.

Application filed September 11, 1908. Serial No. 452,529.

*To all whom it may concern:*

Be it known that I, JOSHUA D. MARVIL, a citizen of the United States, residing at Laurel, in the county of Sussex and State of Delaware, have invented new and useful Improvements in Wheel-Tires, of which the following is a specification.

This invention relates to wheels, and particularly to a yielding or elastic tire for a wheel wherein a cushioning effect is produced without utilizing pneumatic means or an inner inflated tube or chamber under pneumatic pressure.

The essential object of the invention is to provide a wheel having a conveniently assembled inclosed spring organization or sections capable of detachment without removing all of the said sections when it is necessary to repair or replace any one of the sections, and further to interposé protective means between the outer tire and the spring sections of such nature as to prevent rapid wear of the outer tire and serve as an auxiliary cushioning element.

A further object of the invention is to provide a wheel with a tire of the class specified of a comparatively simple construction and one wherein the operation is effective and the general organization strong and durable.

With these and other objects and advantages in view, the invention consists in the construction and arrangement of the several parts which will be more fully hereinafter specified.

In the drawing: Figure 1 is a side elevation of a wheel partially broken away and embodying the features of the invention. Fig. 2 is a transverse vertical section through the wheel rim and tire portion. Fig. 3 is a detail perspective view of one of the spring attaching sections.

Similar characters of reference are employed to indicate corresponding parts in the several views.

The numeral 1 designates a hub having spokes 2 radially projecting therefrom and connected to a rim 3 to which side plates 4 are applied and have outer inturned or bent edges 5 to form seats. The wheel structure so far as the hub, spokes and rim are concerned is not essential and any preferred or suitable form of wheel may be adopted and have the features of the invention applied thereto. Likewise the side plates 4 may be modified, and the features of the invention will now be particularly described. Surrounding the rim 3 at a suitable distance from the latter and in concentric relation thereto is a metal band 6 which is continuous and has secured to the inner side thereof at regular intervals a plurality of spring attaching sections 7 which consist of metal strips lighter and narrower than the band 6 and removably held against the latter by nutted fastenings 8 or any other suitable separable securing means. Each of the spring supporting sections 7 carries a plurality of headed studs, rivets or like devices 9 to which the outer ends of a corresponding plurality of springs 10 are attached, the inner extremity of each spring being held close to the outer edge of the rim 3 by the head of a bolt 11 removably extending through the rim and engaged by a separable nut and washer 12 whereby the several springs may be released from the rim and each section with a group of springs, three being shown in each group, detached from the band 6 and withdrawn for repair purposes or for replacement by a similar section and springs without removing the remaining springs or requiring a complete reorganization of the tire structure. The side plates 4 are secured in place by removable fastenings and either one or both may be separated from the rim 3 and expose the spring sections just explained.

Applied snugly against the outer side or face of the band 6 is a solid rubber shield 13 of semicircular form in cross-section and having its flat side engaging the outer side or face of the said band. Over the shield 13 an outer tire or clencher of usual form is applied and snugly embraces the shield 13, the edges of the outer tire or clencher being separably caught and held in the seats formed at the outer edges of the side plates 4. It will be seen from Fig. 2 that the central thickened tread portion of the tire 14 becomes practically continuous with the resilient shield 13, and the latter being interposed between the metallic band 6 and the tire 14 prevents wear on the outer tire and also augments the resilient action of the complete tire organization and conjointly operates with the springs 10 to absorb vibrations and take up shocks or jars to a material extent. The springs 10 are also fully inclosed and dust and dirt are excluded from the springs or the space between the outer edge or face of the rim and the caught or secured edges of the outer tire and consequently practical service of the springs will be prolonged. By the use of the tire organization just explained the inconveniences and disadvantages arising from punctures of different portions of the tire subjected to exterior exposure are avoided.

What is claimed as new is:

1. In a wheel, the combination of a rim, a continuous band surrounding and spaced from the rim, a plurality of sections removably attached to the inner side of the band and carrying a plurality of coiled springs, the springs having their outer terminals secured to the sections and projected inwardly from the latter, fastening devices individually engaging the inner extremities of the springs and separably applied to the rim, the inner portions of the fastenings being exposed at the inner periphery of the rim, the sections and springs carried thereby being individually removable and replaceable without dissociating the remaining sections and springs, and an elastic cushioning device applied over the outer side of the band.

2. In a wheel, the combination of a rim, a continuous band surrounding and spaced from the rim, a plurality of sections separably attached to the inner side of the band and carrying springs which are projected inwardly between the said sections and the rim and bear upon the latter, fastening devices individually engaging the inner ends of the springs and removably projected through the rim and having their inner secured extremities exposed at the inner periphery of the rim, the sections and springs carried thereby being individually removable and replaceable without dissociating the remaining sections and springs, and an outer resilient tire applied over the band and secured to the rim.

3. In a wheel, the combination of a rim, a continuous band surrounding and spaced at a distance from the rim, a plurality of plate sections separably attached to the inner side of the band and carrying coiled springs which are projected inwardly and bear against the outer edge of the rim, fastening devices individually engaging the inner ends of the springs and removably extending through the rim and having their inner extremities exposed at the inner periphery of the rim, each of the sections and springs carried thereby being independently removable from the wheel without dismantling the rim, continuous band, and remaining sections, an auxiliary cushioning device applied directly against the outer side of the band, and an outer elastic tire closely embracing the said auxiliary cushioning device and covering the band and sections and inclosing the springs, the said outer tire being connected to the rim.

4. In a wheel, the combination of a rim, a continuous band surrounding and held at a distance from the rim, a plurality of flat metallic sections separably attached to the inner side of the band and carrying inwardly projecting coiled springs which are secured at their outer ends thereto and separable with the said sections, fastening devices secured to the inner ends of the springs and removably applied to the rim, the metallic sections carrying the springs being independent with relation to the remaining sections and individually removable, and a cushioning means applied over the outer side of the band.

5. In a wheel, the combination of a rim, a continuous band surrounding and held at a distance from the rim, a plurality of sections directly applied against and separably attached to the inner side of the band and carrying inwardly projecting coiled springs, fastening devices secured to the inner ends of the springs and removably attached to the rim, an auxiliary cushioning device applied directly to and extending fully over the outer side of the band, side plates removably attached to the rim, the several sections carrying the springs being structurally independent and individually detachable from the band and rim, and an outer tire closely embracing and engaging the said auxiliary cushioning device and connected to the edges of the side plates, the springs being fully inclosed within the outer tire and side plates.

In testimony whereof I have hereunto set my hand in presence of two subscribing witnesses.

JOSHUA D. MARVIL.

Witnesses:
THOMAS J. PYLE,
ROBERT W. YARNALL.